US012152222B2

(12) United States Patent
Piorkowski et al.

(10) Patent No.: US 12,152,222 B2
(45) **Date of Patent: *Nov. 26, 2024**

(54) DELAYED ONSET FLUID GELS FOR USE IN UNIT DOSE LAUNDRY DETERGENTS CONTAINING COLLOIDAL PARTICLES

(71) Applicant: Henkel AG & Co. KGaA, Duesseldorf (DE)

(72) Inventors: Daniel Thomas Piorkowski, Fairfield, CT (US); Frank Meier, Duesseldorf (DE); Peter Schmiedel, Duesseldorf (DE)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/145,370

(22) Filed: Dec. 22, 2022

(65) Prior Publication Data

US 2023/0123745 A1 Apr. 20, 2023

Related U.S. Application Data

(62) Division of application No. 16/947,208, filed on Jul. 23, 2020, now Pat. No. 11,566,209.

(51) Int. Cl.

| | |
|---|---|
| ***C11D 1/04*** | (2006.01) |
| ***C11D 1/22*** | (2006.01) |
| ***C11D 1/29*** | (2006.01) |
| ***C11D 1/72*** | (2006.01) |
| ***C11D 1/83*** | (2006.01) |
| ***C11D 1/831*** | (2006.01) |
| ***C11D 3/50*** | (2006.01) |
| ***C11D 11/00*** | (2006.01) |

(52) U.S. Cl.

CPC ................ *C11D 3/505* (2013.01); *C11D 1/29* (2013.01); *C11D 1/831* (2013.01)

(58) Field of Classification Search

CPC .... C11D 1/04; C11D 1/22; C11D 1/29; C11D 1/72; C11D 1/83; C11D 1/831; C11D 3/505; C11D 11/00; C11D 17/042

See application file for complete search history.

(56) References Cited

U.S. PATENT DOCUMENTS

| | | | | |
|---|---|---|---|---|
| 11,441,100 | B2 * | 9/2022 | Piorkowski | C11D 1/72 |
| 11,718,816 | B2 * | 8/2023 | Piorkowski | C11D 17/0008 510/416 |
| 2018/0216033 | A1 * | 8/2018 | Camire | C11D 17/0026 |
| 2018/0216034 | A1 | 8/2018 | Camire et al. | |
| 2021/0155883 | A1 * | 5/2021 | Piorkowski | C11D 17/0008 |

FOREIGN PATENT DOCUMENTS

| | | | |
|---|---|---|---|
| EP | 3202878 | A2 | 8/2017 |
| WO | WO-2021102439 | A1 | 5/2021 |

OTHER PUBLICATIONS

Supplementary European Search Report—WO PCT/US2021/043011—Completed: Jun. 12, 2024 Mailing date: Jun. 18, 2024, Number of pp. 7.

* cited by examiner

*Primary Examiner* — Brian P Mruk
(74) *Attorney, Agent, or Firm* — Bojuan Deng

(57) ABSTRACT

Disclosed is a unit dose laundry detergent product containing an in-vitro, delayed onset fluid gel detergent composition and a water soluble film pouch for enclosing the detergent composition. The composition includes a linear alkylbenzene sulfonate and/or an alcohol ethoxy sulfate having a $C_8$-$C_{20}$ backbone that is ethoxylated with from about 1 to about 10 moles of ethylene oxide, and a non-ionic surfactant comprising an alkoxylated alcohol, in an amount from 20 to 70 wt %, water in an amount from about 10 to about 30 wt %, free fatty acids in an amount from about 2 to 12 wt %, a magnesium cation in an amount of from 0.15 to 1 wt %, and colloidal particles such as an encapsulated fragrance. The composition is opacified and structured yet free of a structuring agent or an opacifying agent. Also disclosed is a method of making such product.

12 Claims, No Drawings

DELAYED ONSET FLUID GELS FOR USE IN UNIT DOSE LAUNDRY DETERGENTS CONTAINING COLLOIDAL PARTICLES

This application is a divisional of Ser. No. 16/947,208, filed Jul. 23, 2020, now U.S. Pat. No. 11,566,209.

FIELD OF THE INVENTION

The present invention is in the field of cleaning detergents, specifically, laundry detergents. More specifically, the present invention relates to a unit dose (unitized) liquid laundry detergent. Even more specifically, the present invention relates to a liquid detergent in the unit dose is capable of creating a delayed-onset fluid gel that is both structured and opacified.

BACKGROUND OF THE INVENTION

In laundry detergents, a detergent composition may be structured in order to suspend particles therein. Such particles may include colloidal materials (e.g., encapsulated fragrances).

Encapsulated fragrances in liquid laundry detergent are significantly more effective at keeping laundered textiles (clothes) more fragrant than unencapsulated oil. It is possible for encapsulated fragrances to keep laundered textiles scented for over 1 to 3 months, whereas unencapsulated oils may only keep laundered textiles scented for 1 to 10 days. During the washing of textiles with the liquid laundry detergent, encapsulated fragrances can adhere to or become entangled in the fibers of textiles. After drying the encapsulates become brittle and when the textiles are worn, the rubbing of the textile ruptures the dried encapsulate and it releases fragrance that was encapuslated.

However, due the density differences, it is typically not possible to properly suspend fragrances in a liquid detergent composition without use of a structurant. Fragrance oils generally have a density of approximately 0.9 grams/mL, which is lighter than that of detergent liquids (1.01 to 1.10 g/mL). Once they are encapsulated with shells, the density of the encapsulated fragrances may be greater than that of the detergent. Without a structurant, the encapsulated fragrance is only gravitationally stable if the encapsulate's density matches the exact density of the liquid detergent. Otherwise, it will be unstable and the encapsulates will cream upwards if the density is less than the detergent liquid or they will sedimentate if the encapsulate's density is greater than the detergent liquid.

To structure detergents, pre-mixed materials are typically added to the liquid. These pre-mixes usually require a heating and homogenization step, which can create complexity to the manufacturing process. One embodiment of known art uses crystallized hydrogenated castor oil (HCO), surfactants and non-amino functional alcohols to structure the detergent, as described in US 2014/0094397 (Guida et al.) and US 2018/0037854 (Somerville Roberts et al.). To structure a liquid detergent using the methods described in US 2014/0094397 and US 2018/0037854, an external structuring system (ESS) must first be created.

As described in WO 2011/031940 (Boutique et al.), a mixture of anionic surfactant, water, organic non-amino-functional alcohols, alkanolamines and HCO are heated to 50 to 150 C, emulsified, cooled and then sheared. Afterwards, the ESS is ready to be added to the detergent liquid to structure it.

Therefore, there is a continuous need in the industry to provide a novel, stable structured detergent composition to ubiquitously suspend particles therein throughout the shelf-life of the product. Preferably, the detergent composition can be structured, as the last step in the manufacturing process, i.e., after a masterbatch (but for the structuring agent), all in liquid form, has been prepared, to simplify the manufacturing process and optimize its efficiency. When it comes to preparing unit dose laundry detergent products, it is further preferred that the detergent composition becomes structured shortly after the entire composition has been enclosed is a pouch (i.e., after filling); even more preferably, the structured detergent composition is in the form of a fluid gel so as to provide aesthetically pleasing to the consumer who can easily observe it through a transparent pouch film.

SUMMARY OF THE INVENTION

It has been surprisingly found by the inventors of the present application that certain combinations of magnesium cation, surfactant, water, and free fatty acids can create a delayed onset fluid gel that is stable and structured with a yield capable of suspending encapsulated fragrances. The fluid gel typically sets within 1 to 3 days of filling. This discovery enables the addition of magnesium cation minutes to hours prior to filling, which prevents production facilities from being negatively impacted if there is a malfunction with processing equipment (i.e. liquid setting as gels in processing lines or within mixing vessels). It has also been unexpected discovered that embodiments of the present invention demonstrate stability for at least 3 months and create a yield point greater than 1 Pa. Further, the materials providing the fluid gel effect are 100% biodegradable and can be achieved without the need of pre-mixes, heating, or additional polymers.

Accordingly, in one aspect, a fluid-gel detergent composition having a yield for transitioning between a gel stage and a fluid stage under sheer stress is provided. The detergent composition comprises: (A) a surfactant system present in an amount of about 20 to about 70 weight percent based on a total weight of the detergent composition, (B) water present in a total amount of from about 10 to about 30 weight percent based on a total weight of the detergent composition; (C) a free fatty acid or a salt thereof present in an amount of from about 2 to about 12 weight percent based on a total weight of the detergent composition, wherein the salt of the fatty acid is capable of being neutralized in the composition to release the free fatty acid; (D) a magnesium salt comprising a magnesium cation component and a counterion component; and (E) colloidal particles homogenously dispersed in the detergent composition.

The free fatty acid, or the salt thereof, may be derived from palm kernel or coconut having a $C_{12}$-$C_{20}$ backbone.

In some embodiments, the magnesium cation component is present in an amount of from about 0.05 to about 1.0 weight percent based on a total weight of the detergent composition; wherein a weight ratio between the fatty acid and the magnesium salt is from 2:1 to 30:1.

The surfactant system of the detergent composition comprises (1) an alcohol ethoxy sulfate having a $C_8$-$C_{20}$ backbone that is ethoxylated with from about 1 to about 10 moles of ethylene oxide; (2) at least one non-ionic surfactant comprising an alkoxylated alcohol.

In preferred embodiments, the composition is free of a structuring polymer and free of an opacifying agent.

The detergent composition has a yield point value equaling to or greater than 0.075 Pa at 20° C. With this yield point, it is capable of suspending encapsulated fragrances for over 3 months. Before the yield point is reached, the detergent composition acts as a gel or plastic. After the yield point is reached upon applying sheer stress onto the detergent composition, the detergent composition flows freely. A yield point can be measured using a standard rheometer, where increasing shear stress is slowly applied to the liquid until enough stress is applied to shear or strain the liquid.

Further, the detergent composition has a turbidity greater than 1000 NTU (Nephelometric Turbidity Units) at 20° C. and is substantially free of any crystallized triglycerides-based ESS such as Hydrogenated Castor Oil. Further, this composition requires no pre-mixes and does not require heating above 50° C. to allow for crystals to be melted so they can re-orientate themselves during the cooling process.

As briefly introduced earlier, the detergent composition exhibits superior and unexpected results. Specifically, it was discovered that a particular combination of surfactants, free fatty acid, water, and magnesium cation at particular weight ratios of actives creates a delayed onset fluid gel, capable of structuring of the detergent for over 3 months at 20° C. in a unitized laundry detergent pack. This delayed onset fluid gel and structuring effect only occurs after a minimum amount of magnesium cation is added and the "setting" process begins after all the materials are well blended. Prior to the magnesium cation addition, no material provides opacification or structuring. The structuring effect can be greater than 0.075 Pa, which is capable of suspending encapsulated fragrances for over 3 months. Further, if not enough magnesium cation or free fatty acid is added, there is no delayed onset fluid gel or structuring effect.

In another aspect, this disclosure provides a unit dose detergent product comprising a container made of a water soluble film which encloses the detergent composition as described above.

In another aspect, this disclosure provides a method in which all materials except for the magnesium cation are well blended together as a transparent composition and then a sufficient amount of the magnesium cation is added as a salt to the composition (e.g. magnesium chloride hexahydrate), which creates a delayed onset fluid gel, opacification and structuring effect (a yield point greater than 1 Pa), which slowly increases in yield over time and generally reaches its maximum after 24 hours. This method does not require the use of specific pre-mixes, heating, is free of polymers and is not time sensitive; to allow for polymeric or crystalline components to orientate themselves to allow turbidity or structuring.

DETAILED DESCRIPTION OF THE INVENTION

The following detailed description is merely exemplary in nature and is not intended to limit the disclosure. Furthermore, there is no intention to be bound by any theory presented in the preceding background or the following detailed description.

Embodiments of the present disclosure are generally directed to detergent compositions and methods for forming the same. For the sake of brevity, conventional techniques related to detergent compositions may not be described in detail herein. Moreover, the various tasks and process steps described herein may be incorporated into a more comprehensive procedure or process having additional steps or functionality not described in detail herein. In particular, various steps in the manufacture of detergent compositions are well-known and so, in the interest of brevity, many conventional steps will only be mentioned briefly herein or will be omitted entirely without providing the well-known process details.

This disclosure provides a detergent composition that includes a surfactant system present in an amount of about 20 to about 70 weight percent actives based on a total weight of the detergent composition and including (a) at least one anionic surfactant including a linear alkylbenzene sulfonate and/or an alcohol ethoxy sulfate having a $C_8$-$C_{20}$ backbone that is ethoxylated with from about 1 to about 10 moles of ethylene oxide, (b) at least one non-ionic surfactant including an alkoxylated alcohol. The detergent composition also includes free fatty acid, typically derived from palm kernel or coconut having a $C_{12}$-$C_{20}$ backbone present in a total amount of from about 2 to about 12 weight percent based on a total weight of the detergent composition. The detergent composition also includes water present in a total amount of from about 10 to about 30 weight percent based on a total weight of the detergent composition and a magnesium salt with the magnesium portion present in an amount of from about 0.15 to about 1.0 weight percent actives based on a total weight of the detergent composition. Moreover, the detergent composition has a turbidity greater than 1000 NTU (Nephelometric Turbidity Units) at 20° F. and is free of any additional polymers that impart turbidity and creates a yield greater than 0.075 Pa.

In one aspect, the present disclosure provides a detergent composition with a consistent, stable yield that is greater than 1 Pa or in another aspect, greater than 5 Pa, or in an additional aspect, greater than 10 Pa, or in an additional aspect, greater than 15 Pa. The detergent composition may be used in a liquid laundry detergent product.

In accordance with another aspect, the present disclosure provides a method in which all materials except for the magnesium cation are well blended together as a transparent composition and then a sufficient amount of the magnesium cation is added as a salt to the composition (e.g. magnesium chloride), which creates an instantaneous opacification and structuring effect. This method is particularly useful for the industry, as transparent and opacified/structured liquid detergents can be created from the same masterbatch (a nearly complete liquid composition with less than 3% of materials withheld for post-dosing, product differentiating materials such as fragrance and dyes), with the transparent liquid detergent having additional water added as the last step and the delayed onset fluid gel, opacified and structured detergent having magnesium cation added as the last step. This flexibility reduces manufacturing complexity and allows differentiating products to be made from the same masterbatch.

Detergent Composition

This disclosure provides the detergent composition, first introduced above and hereinafter referred to as a composition. The composition may be, include, consist essentially of, or consist of, the surfactant system, free fatty acid, magnesium cation, water and encapsulated fragrance, as each is described below, e.g. in any one or more of the amounts described in greater detail below.

In one embodiment, the composition comprises the surfactant system, free fatty acid, magnesium, encapsulated fragrance, and water.

In another embodiment, the composition consists essentially of the surfactant system, free fatty acid, magnesium, encapsulated fragrance, and water.

In still another embodiment, the composition consists of the surfactant system, free fatty acid, magnesium, encapsulated fragrance, and water.

In yet another embodiment, the composition comprises the surfactant system, free fatty acid, magnesium, encapsulated fragrance, and water, and one or more optional additives described below.

In another embodiment, the composition consists essentially of the surfactant system, free fatty acid, magnesium, encapsulated fragrance, and water, and one or more optional additives described below.

In another embodiment, the composition consists of the surfactant system free fatty acid, magnesium, and water, encapsulated fragrance, and one or more optional additives described below.

In further embodiments, the composition is free of, or includes less than 1, 0.5, 0.1, 0.05, or 0.01, weight percent of, any one or more of the optional components or additives described above or below.

Surfactant System

As introduced above, the composition includes the surfactant system present in an amount from about 20 to about 65 weight percent actives based on a total weight of the detergent composition. In various embodiments, the surfactant system may be present in an amount from about 30 to about 60, from about 40 to about 50, about 40, 50, 60 or 70 weight percent actives based on a total weight of the detergent composition.

The surfactant system includes, is, consists essentially of, or consists of, (1) an anionic surfactant, an alcohol ethoxy sulfate having a $C_8$-$C_{20}$ backbone that is ethoxylated with from about 1 to about 10 moles of ethylene oxide, (2) at least one non-ionic surfactant including an alkoxylated alcohol; and (3) at least one anionic surfactant including a linear alkylbenzene sulfonate. In some embodiments, the weight ratio of all anionic surfactants and all non-ionic surfactants is from 3:1 to 1:3, from 2:1 to 1:2, or about 1:1.

In one embodiment, the surfactant system includes (1) an alcohol ethoxy sulfate having a $C_8$-$C_{20}$ backbone that is ethoxylated with from about 1 to about 10 moles of ethylene oxide, (2) at least one non-ionic surfactant including an alkoxylated alcohol; and (3) at least one anionic surfactant including a linear alkylbenzene sulfonate.

In another embodiment, the surfactant system consists essentially of (1) an alcohol ethoxy sulfate having a $C_8$-$C_{20}$ backbone that is ethoxylated with from about 1 to about 10 moles of ethylene oxide, (2) at least one non-ionic surfactant including an alkoxylated alcohol; and (3) at least one anionic surfactant including a linear alkylbenzene sulfonate.

In a further embodiment, the surfactant system consists of (1) an alcohol ethoxy sulfate having a $C_8$-$C_{20}$ backbone that is ethoxylated with from about 1 to about 10 moles of ethylene oxide, (2) at least one non-ionic surfactant including an alkoxylated alcohol; and (3) at least one anionic surfactant including a linear alkylbenzene sulfonate.

In a further embodiment, the surfactant system consists of (2) at least one non-ionic surfactant including an alkoxylated alcohol; and (3) at least one anionic surfactant including a linear alkylbenzene sulfonate and is substantially free of (1) an alcohol ethoxy sulfate.

The surfactant system is present in an amount of about 20 to about 70 weight percent actives based on a total weight of the detergent composition. In various embodiments, this amount is from about 25 to about 65, about 30 to about 60, about 35 to about 55, about 40 to about 50, weight percent actives based on a total weight of the detergent composition. In various non-limiting embodiments, all values, both whole and fractional, between and including all of the above, are hereby expressly contemplated for use herein.

Alcohol Ether Sulfate

The surfactant system may include the (1) alcohol ethoxy sulfate, which may be described as an anionic surfactant. The alcohol ethoxy sulfate has a $C_8$-$C_{20}$ backbone that is ethoxylated with from about 1 to about 10 moles of ethylene oxide. Alternatively, the alcohol ethoxy sulfate may be described as having a $C_8$-$C_{20}$ backbone and about 1 to 10 moles of ethylene oxide units bonded thereto. The metal may be any metal but is typically sodium or potassium. The backbone of the surfactant system may have any number of carbon atoms from 8 to 20, e.g. 10 to 18, 12 to 16, 12 to 14, 14 to 16, or 8, 9, 10, 11, 12, 13, 14, 15, 16, 17, 18, 19, or 20, carbon atoms. Various mixtures of alcohol ethoxy sulfates may also be used wherein different length backbones are utilized. The backbone is ethoxylated with from about 1 to about 10, about 2 to about 9, about 3 to about 8, about 4 to about 7, about 5 to about 6, or 1, 2, 3, 4, 5, 6, 7, 8, 9, or 10, moles of ethylene oxide. In various non-limiting embodiments, all values, both whole and fractional, between and including all of the above, are hereby expressly contemplated for use herein.

In various embodiments, the alcohol ethoxy sulfate is further defined as sodium laureth sulfate (SLES) having the formula: $CH_3(CH_2)_{10}CH_2(OCH_2CH_2)_nOSO_3Na$ wherein n is from about 1 to about 10. In another embodiment, the alcohol ethoxy sulfate is sodium laureth sulfate ethoxylated with about 2 to about 4 moles of ethylene oxide. In various non-limiting embodiments, all values, both whole and fractional, between and including all of the above, are hereby expressly contemplated for use herein.

Non-Ionic Surfactant Including an Alkoxylated Alcohol

The surfactant system also includes the (2) at least one non-ionic surfactant that includes, is, consists essentially of, or consists of, an alkoxylated alcohol. The terminology "at least one" means that one or more than one non-ionic surfactant may be utilized herein.

In one embodiment, the non-ionic surfactant includes an alkoxylated alcohol.

In one embodiment, the non-ionic surfactant consists essentially of an alkoxylated alcohol.

In one embodiment, the non-ionic surfactant consists of, an alkoxylated alcohol.

The alkoxylated alcohol may be a $C_8$-$C_{20}$ alcohol that is capped with (or comprises) approximately 2 to 12 moles of an alkylene oxide. In other embodiments, the alkoxylated alcohol may be an alcohol alkoxylate that has from 8 to 20, 10 to 18, 12 to 16, or 12 to 14, carbon atoms and is an ethoxylate, propoxylate, or butoxylate and is capped with an alkylene oxide, e.g. ethylene oxide, propylene oxide, or butylene oxide. The alcohol alkoxylate may be capped with varying numbers of moles of the alkylene oxide, e.g. about 2 to about 12, about 3 to about 11, about 4 to about 10, about 5 to about 9, about 6 to about 8, or about 7 to about 8, moles. In various non-limiting embodiments, all values, both whole and fractional, between and including all of the above, are hereby expressly contemplated for use herein.

Anionic Surfactant Including a Linear Alkylbenzene Sulfonate

The surfactant system also includes at least one anionic surfactant that includes, is, consists essentially of, or consists of, a linear alkylbenzene sulfonate (LAS). The terminology "at least one" means that one or more than one anionic surfactant may be utilized herein.

In one embodiment, the at least one anionic surfactant includes a linear alkylbenzene sulfonate (LAS).

In one embodiment, the at least one anionic surfactant consists essentially of a linear alkylbenzene sulfonate (LAS).

In one embodiment, the at least one anionic surfactant consists of a linear alkylbenzene sulfonate (LAS).

The linear alkylbenzene sulfonate may have a linear alkyl chain that has, e.g. 10 to 13 carbon atoms. These carbon atoms are present in approximately the following mole ratios C10:C11:C12:C13 is about 13:30:33:24 having an average carbon number of about 11.6 and a content of the most hydrophobic 2-phenyl isomers of about 18-29 wt %. The linear alkylbenzene sulfonate may be any known in the art. In various non-limiting embodiments, all values, both whole and fractional, between and including all of the above, are hereby expressly contemplated for use herein.

In one embodiment, the alcohol ethoxy sulfate is sodium laureth sulfate ethoxylated with about 2 to about 4 moles of ethylene oxide, the linear alkyl benzenesulfonate has a linear alkyl chain that has from about 10 to about 13 carbon atoms, and the alkoxylated alcohol is an ethoxylated alcohol including a $C_8$-$C_{20}$ backbone that is ethoxylated with from about 2 to about 12 moles of ethylene oxide.

In another embodiment, the (1) alcohol ethoxy sulfate is sodium laureth sulfate ethoxylated with about 2 to about 4 moles of ethylene oxide, the (2) alkoxylated alcohol is a C12-C15 alcohol ethoxylate that is capped with approximately 7 moles of ethylene oxide; and the (3) linear alkyl benzenesulfonate is 2-Phenyl Sulfonic Acid.

In a further embodiment, the (2) alkoxylated alcohol is a C12-C15 alcohol ethoxylate that is capped with approximately 7 moles of ethylene oxide; and the (3) linear alkyl benzenesulfonate is 2-Phenyl Sulfonic Acid, and the mixture is free of the (1) alcohol ethoxy sulfate.

Additional Surfactants

In other embodiments, one or more additional surfactants may be utilized and may be or include cationic, anionic, non-ionic, and/or zwitterionic surfactants, and/or combinations thereof. Additional anionic surfactants may include soaps which contain sulfate or sulfonate groups, including those with alkali metal ions as cations, can be used. Usable soaps include alkali metal salts of saturated or unsaturated fatty acids with 12 to 18 carbon (C) atoms. Such fatty acids may also be used in incompletely neutralized form. Usable ionic surfactants of the sulfate type include the salts of sulfuric acid semi esters of fatty alcohols with 12 to 18 C atoms. Usable ionic surfactants of the sulfonate type include alkane sulfonates with 12 to 18 C atoms and olefin sulfonates with 12 to 18 C atoms, such as those that arise from the reaction of corresponding mono-olefins with sulfur trioxide, alpha-sulfofatty acid esters such as those that arise from the sulfonation of fatty acid methyl or ethyl esters. In various non-limiting embodiments, all values, both whole and fractional, between and including all of the above, are hereby expressly contemplated for use herein.

Other suitable examples of additional nonionic surfactants include alkyl glycosides and ethoxylation and/or propoxylation products of alkyl glycosides or linear or branched alcohols in each case having 12 to 18 carbon atoms in the alkyl moiety and 3 to 20, or 4 to 10, alkyl ether groups. Corresponding ethoxylation and/or propoxylation products of N-alkylamines, vicinal diols, and fatty acid amides, which correspond to the alkyl moiety in the stated long-chain alcohol derivatives, may furthermore be used. Alkylphenols having 5 to 12 carbon atoms may also be used in the alkyl moiety of the above described long-chain alcohol derivatives. In various non-limiting embodiments, all values, both whole and fractional, between and including all of the above, are hereby expressly contemplated for use herein.

In other embodiments, the additional surfactant is chosen from nonionic and ionic surfactants, such as alkoxylates, polyglycerols, glycol ethers, glycols, polyethylene glycols, polypropylene glycols, polybutylene glycols, glycerol ester ethoxylates, polysorbates, alkyl ether sulfates, alkyl- and/or arylsulfonates, alkyl sulfates, ester sulfonates (sulfo-fatty acid esters), ligninsulfonates, fatty acid cyanamides, anionic sulfosuccinic acid surfactants, fatty acid isethionates, acylaminoalkane-sulfonates (fatty acid taurides), fatty acid sarcosinates, ether carboxylic acids and alkyl(ether)phosphates. In such embodiments, suitable nonionic surfactants include $C_2$-$C_6$-alkylene glycols and poly-$C_2$-$C_3$-alkylene glycol ethers, optionally, etherified on one side with a $C_1$-$C_6$-alkanol and having, on average, 1 to 9 identical or different, typically identical, alkylene glycol groups per molecule, and also alcohols and fatty alcohol polyglycol ethers, typically propylene glycol, dipropylene glycol, trimethylolpropane, and fatty alcohols with low degrees of ethoxylation having 6 to 22, typically 8 to 18, more typically 8 to 12, and even more typically 8 to 11, carbon atoms. Moreover, suitable ionic surfactants include alkyl ether sulfates, sulfosuccinic acid surfactants, polyacrylates and phosphonic acids, typically lauryl sulfate, lauryl ether sulfate, sodium sulfosuccinic acid diisooctyl ester, 1-hydroxyethane-1,1-diphosphonic acid, and diacetyltartaric esters. In various non-limiting embodiments, all values, both whole and fractional, between and including all of the above, are hereby expressly contemplated for use herein.

The one or more additional surfactants may be part of the surfactant system, as described above, or may be independent from the surfactant system. In various embodiments, the one or more additional surfactants is or includes an additional anionic surfactant and/or a non-ionic surfactant. However, other surfactants such as cationic and/or zwitterionic (amphoteric) surfactants may also be utilized or may be excluded from the composition.

Water

The detergent composition also includes water. Water is present in the composition in a total amount of from about 7 to about 30 weight percent based on a total weight of the composition. In various embodiments, the water is present in an amount of from about 7 to about 10, from about 10 to about 15, from about 15 to about 20, from about 20 to about 25, from about 25 to about 30, about 7 to 12, from 7 to about 15, from about 10 to about 20, about 11 to about 28, about 12 to about 23, or about 7, 10, 12, 14, 15, 16, 18, 20, or 22 weight percent based on a total weight of the composition. Typically, the terminology "total amount" refers to a total amount of water present in the composition from all components, i.e., not simply water added independently from, for example, the surfactant system. In various non-limiting embodiments, all values, both whole and fractional, between and including all of the above, are hereby expressly contemplated for use herein.

Free Fatty Acid

The detergent composition also includes a free fatty acid component that may be derived from palm kernel or coconut. Suitable free fatty acid may be any fatty acid having formula: $R_3$—C(O)OH, wherein $R_3$ is a $C_5$-$C_{21}$ linear or branched aliphatic group. Preferably, the $R_3$ is a $C_{13}$-$C_{21}$ linear or branched aliphatic group. In a preferred embodiment, the fatty acid is dodecanoic acid (also known as coconut fatty acid).

In addition to its free acid form, a salt form of the acid is encompassed by the scope of the invention. For example, instead of using $R_3$—C(O)OH, one may use $R_3$—C(O)$O^-$ $M^+$ in a liquid detergent composition. The final form of $R_3$—C(O)OH or $R_3$—C(O)$O^-$ depends on the pH and counter ion in a liquid composition.

Free fatty acid or a salt thereof is present in the composition in a total amount of from about 2 to about 12 weight percent based on a total weight of the composition. In various embodiments, the free fatty acid is present in an amount of from about 2.5 to about 12, about 3 to about 10, about 4 to about 10, or about 6, 8, or 10, weight percent based on a total weight of the composition.

Magnesium Cation

The detergent composition also includes a magnesium cation for triggering the transition of the detergent composition from liquid to gel. The magnesium cation may be derived from the following salts: magnesium chloride, magnesium sulfite, magnesium bisulfite, magnesium sulfate. However, any anion may work with magnesium cation. In other words, any magnesium salt is within the scope of the invention. Further, the magnesium salt may be in a hydrate form. An exemplary magnesium chloride includes magnesium chloride hexahydrate.

In some embodiments, the magnesium cation is present in the composition in a total amount of from about 0.15 to about 1.0 weight percent based on a total weight of the composition. In various embodiments, the magnesium cation is present in an amount of from about 0.2 to about 0.4, from about 0.25 to about 0.35, from about 0.35 to about 0.45, from about 0.45 to about 0.55, from about 0.55 to about 0.75, from about 0.75 to about 1.0, or about 0.3, about 0.4, about 0.5 weight percent based on a total weight of the composition.

Upon adding a magnesium salt, the composition transitions into a fluid gel over time. The magnesium-based, fluid gel composition significantly reduces or prevents the gravitational separation of colloidal particles such as encapsulated fragrance. A fluid gel also enables different types of dosing methods for the consumer. Further, as will be discussed in detail later, this approach details methods to create an in-process, structured liquid detergent that requires no pre-mixes or opacifying polymers. This approach enables a method to create an in-process, delayed on-set fluid gel, that can be filled into a pack after mixing as a pourable liquid, and within 1 to 3 days, the liquid "sets" in the pack as a fluid gel.

Colloidal Materials

The composition may include one or more colloidal materials such as encapsulated fragrance. Other beneficial colloidal materials may be, and not limited to encapsulated, such as vitamin E acetate, skin care oils and acids, fabric care polymers. The beneficial materials may be encapsulated and form a particle size from 0.1 to 500 microns with a density of 0.8 to 1.25 g/mL.

In some embodiments, the preferred liquid composition comprises at least one encapsulated fragrance. In some embodiments, the liquid composition comprises from 1 to 5, 1 to 4, 1 to 3, 1 to 2, 2 to 5, 2 to 4, 2 to 3, 3 to 5, 3 to 4, or 4 to 5 different types of encapsulated fragrances. In some embodiments, the liquid composition comprises 1, 2, 3, 4, or 5 different types of encapsulated fragrances. In some embodiments, the liquid composition comprises 1 encapsulated fragrance.

In some embodiments, the fragrance is encapsulated in, for example, a water-insoluble shell, a microcapsule, a nanocapsule, or any combination thereof.

In some embodiments, the at least one encapsulated fragrance is encapsulated in a microcapsule. Microencapsulation is a technique by which one material (normally active) is coated with another material or system. The major purposes for using microencapsulation is to isolate incompatible substances present in the same formulation and to control the release of the active ingredient encapsulation. This release can be due to the diffusion of the active through the wall material (sustained release over time), or it can be due to the breakage of the wall capsule (fast release).

In some embodiments, the at least one encapsulated fragrance has a musky scent, a putrid scent, a pungent scent, a camphoraceous scent, an ethereal scent, a floral scent, a peppermint scent, or a combination thereof.

In some embodiments, the at least one encapsulated fragrance comprises an ester, an ether, an aldehyde, a ketone, an alcohol, a hydrocarbon, or any combination thereof. In some embodiments, the at least one encapsulated fragrance comprises methyl formate, methyl acetate, methyl butyrate, ethyl butyrate, isoamyl acetate, pentyl butyrate, pentyl pentanoate, octyl acetate, myrcene, geraniol, nerol, citral, citronellol, linalool, nerolidol, limonene, camphor, terpineol, alpha-ionone, thujone, benzaldehyde, eugenol, cinnamaldehyde, ethyl maltol, vanillin, anisole, anethole, estragole, thymol, indole, pyridine, furaneol, 1-hexanol, cis-3-hexenal, furfural, hexyl cinnamaldehyde, fructone, hexyl acetate, ethyl methyl phenyl glycidate, dihydrojasmone, oct-1-en-3-one, 2-acetyl-1-pyrroline, 6-acetyl-2,3,4,5-tetrahydropyridine, gamma-decalactone, gamma-nonalactone, delta-octalone, jasmine lactone, massoia lactone, wine lactone, sotolon, grapefruit mercaptan, methanthiol, methyl phosphine, dimethyl phosphine, nerolin, 2,4,6-trichloroanisole, or a combination thereof.

In some commercial embodiments, the encapsulated fragrance is supplied as a 10 to 75 weight percent of encapsulates in solution of water and non-aqueous solvents such as glycerin and/or propylene glycol. The encapsulated fragrance solution can be added directly into the laundry detergent or it may be first diluted at a 50:50 weight ratio of glycerine:encapsulated fragrance solution. The pre-dilution (or pre-mix) step may allow for better dispersion of the encapsulated fragrance in the detergent composition.

In some embodiments, the liquid composition comprises by weight about 0.02% to about 5% of colloidal particles. In some embodiments, the liquid composition comprises by weight about 0.01% to about 3.5%, 0.02 to about 1.0%, about 0.15% to about 2.5%, about 0.2% to about 1.5%, about 0.15% to about 0.75%, about 0.15% to about 0.5% of colloidal particles.

In some embodiments, creaming (rising to the surface) or sedimentation (settling to the bottom) of colloidal particles (e.g., encapsulated fragrances) occurs over time, especially during storage of the product. The creaming or sedimentation is due to differences in density between the microcapsule and the surrounding liquid. Many consumer products including liquid household cleaners, liquid laundry products, personal care products, and cosmetic products have densities around 1.01 to 1.1 g/mL, while many organic compounds have densities much lower than 1 g/mL.

To prevent the creaming or sedimentation of colloidal particles such as encapsulated fragrance, it is necessary to structure the liquid detergent so it has a yield, preferably a yield point greater than 0.075 Pa.

It has been unexpectedly discovered that not only that magnesium cations somehow serve as a structuring agent, the resulting fluid gel formed after a magnesium cation is added has a yield and can suspend colloidal materials (such as encapsulated fragrances), which would otherwise be unstable due to gravitational separation.

Non-Aqueous Solvents

In unit laundry dose compositions, non-aqueous solvents are commonly used to maintain stable interactions between the polyvinyl alcohol film and the liquid composition. The wash composition may include at least one non-aqueous solvent in addition to the water in the composition. The non-aqueous solvent may be present in the composition from about 10 to 70, 15 to 65, 17.5 to 50 weight percent based on a total weight of the composition. Suitable non-aqueous solvents include, but are not limited to glycerine (e.g. glycerol, glycerin), propylene glycol, ethanol, polyethylene glycol 200, polyethylene glycol 300, polyethylene glycol 400, polyethylene glycol 600, polyethylene glycol 800.

Additives

The composition may include one or more of additives or may be free of additives.

In some embodiments, additives may be or include neutralizers/pH adjustors just as monoethanolamine and the like, enzymes, optical brighteners, free oil fragrance, encapsulated fragrance, chelators, yellowing control agents (i.e. sodium sulfite) and combinations thereof. These additives may be chosen from any known in the art. In additional embodiments, the composition may be free of enzymes or may be including in multiple chamber unit dose products, into a chamber that is free of enzymes.

In other embodiments, bittering agents may optionally be added to hinder accidental ingestion of the composition. Bittering agents are compositions that taste bad, so children or others are discouraged from accidental ingestion. Exemplary bittering agents include denatonium benzoate, aloin, and others. Bittering agents may be present in the composition at an amount of from about 0 to about 1 weight percent, or an amount of from about 0 to about 0.5 weight percent, or an amount of from about 0 to about 0.1 weight percent in various embodiments, based on the total weight of the composition. In various non-limiting embodiments, all values, both whole and fractional, between and including all of the above, are hereby expressly contemplated for use herein.

Weight Percents/Ratios of Various Components

The surfactant system surfactant system, free fatty acid, water, encapsulated fragrance and magnesium cation component are generally present in amounts within the weight ranges set forth above. However, in additional embodiments, these weight ranges may be narrower and/or specific weight ratios may be utilized. These weight ranges and/or ratios may be representative of embodiments that produce special, superior, and unexpected results, such as those demonstrated in the Examples. Relative to all of the paragraphs set forth immediately below, in various non-limiting embodiments, all values, both whole and fractional, between and including all of the above, are hereby expressly contemplated for use herein.

Without being bound by theory, it is believed that the magnesium cation and the free fatty acid are interacting with one another to form stable crystal structures, that are finely dispersed throughout the entire liquid composition, giving a “milky white”, opacified appearance. When enough crystals are dispersed, it is believed that this creates a yield within the liquid, which enable the suspension of encapsulated fragrances or other colloidal materials. When additional crystals form, it can then form a fluid gel.

In some embodiments, the weight ratio between a free fatty acid and a magnesium salt is from about 2:1 to about 30:1, from about 3:1 to about 25:1, from about 5:1 to about 20:1, from about 10:1 to about 15:1. In other embodiment, the weight ratio between a free fatty acid and a magnesium salt is from about 2:1 to about 3:1, from about 3:1 to about 6:1, from about 6:1 to about 9:1, from about 9:1 to about 12:1, from about 12:1 to about 20:1, from about 20:1 to about 25:1, or from about 25:1 to about 30:1.

In some preferred embodiments, the weight ratio between a free coconut fatty acid and a magnesium cation is from about 16:1 to about 25:1, from about 22:1 to about 33:1.

Surprisingly, the fluid gel exhibits a yield which further enables the suspension of colloidal materials and also facilitates the manufacturing process. At rest or under less stress, such as when a unit dose packs sit on shelf or during typical handling, the fluid gel acts as a plastic to stably support or suspend colloidal materials. But the fluid gel flows freely after sufficient shear is placed on the system. Thus, after formation, a delayed onset fluid gel will behave as a liquid until the system increases in viscosity to “set” or become a gel. Prior to setting, production facilities can fill laundry detergent packs using equipment designed for lower viscosity detergents (i.e. less than 2000 cP at 20 degrees Celsius). This enables filling of the lower viscosity liquid into packs, instead of gels, since it more difficult to fill gelled materials with viscosities above 50,000 cP at 20 degrees Celsius due to the need of specialized pumps and filling nozzles. After the packs are filled and sealed in final product packaging, the liquid then sets into a gel within 1 to 3 days; enabling production facilities to not handle gelled liquids during production.

Typically, liquid compositions that have a yield point greater 0.075 Pa have sufficient yield to significantly reduce or eliminate gravitational separation of colloidal particles. For detergent compositions, it is preferred to have a yield point of at least 0.1 Pa to ensure that it has a strong yield effect.

In one embodiment, the magnesium derived structured liquid is stable for at least 1 week, at least 1 month, at least 3 months, at least 6 months or at least 1 year at 20° F.

In various embodiments, the yield point (Pa) is greater than about 1, greater than about 5, greater than about 10, greater than about 15, greater than about 20, greater than about 25 at 20° F.

Method of Forming the Detergent Composition

This disclosure further provides a method of forming the detergent composition. The method includes a step of combining the surfactant system, water, free fatty acid and optionally one or more additives, such as non-aqueous solvents (e.g., propylene glycol, polyethylene glycol 200 to 600, glycerin, ethanol), free oil (unencapsulated) fragrance, enzymes, non-opacification polymers, or chelators to form a mixture, followed by a step of adding a magnesium cation in the form of a salt (e.g. magnesium chloride), with or without hydrates, to the mixture. The method of mixing may be performed by using shear mixing. Shear mixing may be conducted using an over-the-head mixer such as an IKA RW 20 Digital Mixer at 500 rpm.

Upon adding a magnesium salt, a delayed onset fluid gel, opacification, and structuring effect occur. Encapsulated fragrance can be added before or after the magnesium. Encapsulated fragrance may be pre-diluted before added for mixing for reasons described earlier. Suitable amounts of each component are as described earlier in this application. Each of the aforementioned components may be combined in any order and in whole or partial amounts, but it is preferred for the magnesium cation to be added as the last material to the composition. All orders of addition are hereby expressly contemplated for use in various non-limiting embodiments.

In the method embodiments according to the present application, no opacifying polymer is used to form the detergent composition. In some embodiments, no structuring agent other than a magnesium salt is used to form the detergent composition.

Unit Dose Liquid Laundry Embodiment

This disclosure provides a unit dose embodiment. For example, the composition may include amounts of water and/or any of the other components suitable for a unit dose application, as understood by those of skill in the art. For example, a liquid laundry detergent may include the surfactant system described above that is present in an amount of from about 20 to about 65 weight percent actives based on a total weight of the detergent composition, about 25 to about 55 weight percent water based on a total weight of the detergent composition, and about 30 to about 50 weight percent actives of the surfactant system based on a total weight of the detergent composition.

Typically, the differentiating feature between the liquid laundry embodiments and the unit dose embodiment is the delivery method. A unit dose embodiment is typically encapsulated in a film, as described below whereas the liquid laundry embodiment is typically provided in a bottle for use. Further, it is commonly known in the art for the unit dose embodiment to contain less water, more non-aqueous solvent and more surfactant versus the liquid laundry embodiment due to the need of maintaining stable liquid to polyvinyl alcohol film interactions (e.g. prevention of floppy packs, pack leakers, 2 packs fusing together, etc.)

Unit Dose Pack

This disclosure provides a unit dose pack that includes a pouch made of a water-soluble film and the detergent composition encapsulated within the pouch, such as the unit dose embodiment described above.

A unit dose pack can be formed by encapsulating the detergent composition within the pouch, wherein the pouch includes a film. In some embodiments, the film forms one half or more of the pouch, where the pouch may also include dyes or other components. In some embodiments, the film is water soluble such that the film will completely dissolve when an exterior of the film is exposed to water, such as in a washing machine typically used for laundry. When the film dissolves, the pouch is ruptured and the contents are released. As used herein, "water soluble" means at least 2 grams of the solute (the film in one example) will dissolve in 5 liters of solvent (water in one example) for a solubility of at least 0.4 grams per liter (g/l), at a temperature of 25 degrees Celsius (° C.) unless otherwise specified. Suitable films for packaging are completely soluble in water at temperatures of about 5° C. or greater.

In various embodiments, the film is desirably strong, flexible, shock resistant, and non-tacky during storage at both high and low temperatures and high and low humidities. In one embodiment, the film is initially formed from polyvinyl acetate, and at least a portion of the acetate functional groups are hydrolyzed to produce alcohol groups. The film may include polyvinyl alcohol (PVOH), and may include a higher concentration of PVOH than polyvinyl acetate. Such films are commercially available with various levels of hydrolysis, and thus various concentrations of PVOH, and in an exemplary embodiment the film initially has about 85 percent of the acetate groups hydrolyzed to alcohol groups. Some of the acetate groups may further hydrolyze in use, so the final concentration of alcohol groups may be higher than the concentration at the time of packaging. The film may have a thickness of from about 25 to about 200 microns (μm), or from about 45 to about 100 μm, or from about 70 to about 90 μm in various embodiments. The film may include alternate materials in some embodiments, such as methyl hydroxy propyl cellulose and polyethylene oxide. In various non-limiting embodiments, all values, both whole and fractional, between and including all of the above, are hereby expressly contemplated for use herein.

The unit dose pack may be formed from a pouch having a single chamber, but the unit dose pack may be formed from pouches with two or more different chambers in alternate embodiments. In embodiments with a pouch having two or more chambers, the contents of the different chambers may or may not be the same and not all the different chambers may be preferred to be opacified.

Unit dose packs enclose the detergent compositions as described in the present disclosure are aesthetically pleasing to consumers because the liquid gel inside the unit dose packs stabilizes those finely dispersed particles therein, forms an opacified appearance, and looks full over the shelf life.

Method of Forming Unit Dose Pack

This disclosure also provides a method of forming the unit dose pack. The detergent composition is typically formed first, e.g. using shear mixing, according to the method described earlier, under the section, "Method of Forming the Detergent Composition". The composition may then be encapsulated within a pouch by depositing the composition within the pouch. The pouch may then be sealed to encase and enclose the composition within the pouch to form the unit dose pack. The composition is typically in direct contact with the film of the pouch within the unit dose pack. The film of the pouch is typically sealable by heat, heat and water, ultrasonic methods, or other techniques, and one or more conventional sealing techniques may be used to enclose the composition within the pouch. As described earlier, it is preferred that magnesium salt the last, preferably 5 into the composition mixture, before depositing the detergent composition in liquid into the pouch so that the liquid to gel transition of the detergent composition (i.e., a delayed onset fluid gel) is triggered as late as possible, after formation, a delayed onset fluid gel will behave as a liquid until the system increases in viscosity to "set" or become a gel. Prior to setting, production facilities can fill laundry detergent packs using equipment designed for lower viscosity detergents (i.e. less than 2000 cP at 20 degrees Celsius). This enables filling of the lower viscosity liquid into packs, instead of gels, since it more difficult to fill gelled materials with viscosities above 50,000 cP at 20 degrees Celsius due to the need of specialized pumps and filling nozzles. After the packs are filled and sealed in final product packaging, the liquid then sets into a gel within 1 to 3 days; enabling production facilities to not handle gelled liquids during production.

Generally, the liquid sets into a gel within 1 to 3 days, which enables production facilities to not handle gelled liquids during production.

Specifically, in one embodiment, the method of forming unit dose pack, comprises the steps of mixing a surfactant system, a fatty acid or a salt thereof, water, and at least one addictive ingredient to form a first mixture, wherein the first mixture does not include a magnesium salt; mixing the first mixture with a magnesium salt to form a second mixture from 0.1 second to 5 hours prior to a step of depositing the second mixture to a pouch space formed by a water-soluble film; depositing the second mixture into the pouch formed by a water-soluble film; and sealing the film to enclose the second mixture to form the unit dose detergent product.

In the above method, to obtain the first mixture, the surfactant system may be present in an amount of about 20 to about 70 weight percent based on a total weight of the unit dose detergent product; water may be present in a total amount of from about 10 to about 30 weight percent based on a total weight of the detergent product; and the fatty acid or a salt thereof may be present in an amount of from about 2 to about 12 weight percent based on a total weight of the detergent product.

In some embodiments, the surfactant system may comprise at least one anionic surfactant comprising an alcohol ethoxy sulfate having a $C_8$-$C_{20}$ backbone that is ethoxylated with from about 1 to about 10 moles of ethylene oxide or linear alkylbenzene sulfonate and at least one non-ionic surfactant comprising an alkoxylated alcohol.

Preferably, the first mixture is free of a structuring polymer and free of an opacifying agent. Preferably, the first mixture is free of crystallized triglycerides.

The magnesium salt used in the above method may be a magnesium cation component and a counterion component, wherein the magnesium cation component is present in an amount of from about 0.15 to about 1.0 weight percent based on a total weight of the detergent product. In some preferred embodiments, a weight ratio between the fatty acid and the magnesium salt is from 2:1 to 30:1.

Preferably, the magnesium cation component is derived from magnesium chloride, magnesium sulfite, magnesium bisulfite, or magnesium sulfate.

The method of preparing a unit dose detergent product may further comprise a step of mixing colloidal particles with the first mixture. The colloidal particles may be present in an amount of about 0.02 to 5.0 weight percent based on the total weight of the detergent product. The colloidal particles may comprise an encapsulated fragrance.

The method of preparing a unit dose detergent product may further comprise a step of, after the step of film sealing to form the unit dose detergent product, allowing the resulting enclosed mixture to gel within 1 to 3 days before packaging or shipping the unit dose product.

EXAMPLES

Example 1

The following experiment was used to measure the surprising effect that Magnesium cation can create a delayed onset fluid gel, opacify and structure a liquid laundry composition. Composition 1 (below) was created with a 3.75% hole (meaning that the formula weight of Composition 1 adds up to 96.25%) to post-dose different use-levels of magnesium to the masterbatch (Composition 1). Magnesium was post-dosed as an aqueous solution of 64% Magnesium Chloride Hexahydrate.

TABLE 1

| COMPONENT | COMPOSITION # 1 ACTIVITY % | USE-LEVEL w/w % |
|---|---|---|
| Glycerin | 99 | 10.7 |
| Optical Brightener | 68.0 | 0.5 |
| DI Water | 100.0 | 6.95 |
| Propylene Glycol | 99+ | 5.8 |
| Performance Polymers | 75 | 8.2 |
| Alcohol Ethoxylate C13 to C15, 8EO | 99+ | 24 |
| Linear Alkylbenzene Sulfonic Acid | 96.0 | 24.1 |
| Coconut Fatty Acid | 100.0 | 7.45 |

TABLE 1-continued

| COMPONENT | COMPOSITION # 1 ACTIVITY % | USE-LEVEL w/w % |
|---|---|---|
| Bittering Agent | 25 | 0.04 |
| Fragrance (Neat Oil) | 100 | 0.75 |
| Monoethanolamine | 100 | 6.73 |
| Dye | 1.0 | 0.05 |
| Enzymes | 100.0 | 1.02 |
| QS Glycerin | | QS to 96.25% |
| Total | | 96.25 |

The non-ionic Alcohol Ethoxylate is a C13-C15 Alcohol Ethoxylate that is capped with approximately 8 moles of ethylene oxide.

Linear Alkylbenzene Sulfonic Acid is 2-Phenyl Sulfonic Acid.

Magnesium Chloride Hexahydrate may be available from VWR.

Performance polymer may be Sokalan HP20 (Ethoxylated Polyethyleneimine) or Texcare SRN-170.

Enzymes may be protease, lipase, mannanase, xanthanase, cellulase, and blends thereof.

To determine the percent active of each material in Composition 1, the use-level of the raw material is multiplied by the active percentage of the chemical. For example, bittering agent is 25% active and is used at 0.04% in Composition 1, so there is approximately 0.01% of active bittering agent in Composition 1 (25% active multiplied by 0.04% use-level in formula equals 0.01% of active material in formula).

Table 2 below sets forth ratios of active levels of salts that contain different levels of magnesium (derived from Magnesium Chloride Hexahydrate (MgCl2*6H2O). Each level of Magnesium was postdosed separately into Composition 1 (as described in Table 2 for Compositions 2 to 13) and given 24 hours prior to reading the results. The MgCl2*6H2O was postdosed as a 64% active solution in water. Each composition was QS'd (i.e. additional mater added) with glycerin to make the materials equal to 100 weight percent in the formula. The following compositions were created (Compositions 2 to 13). QS refers to adding a component of choice to the composition until a desired weight percent is reached.

After formation, the NTU value was measured by a Turbidity Meter (2100N Lab Turbidimeter, EPA, 115 Vac by Hach). Turbidity values below 10 are considered transparent whereas turbidity values above 1000 are considered significantly opacified.

After formation, each composition was evaluated to determine viscosity at 20° C., cp, using an AR2000-EX Rheometer at a shear rate of 3.2 l/s with a geometry cone of 40 mm, 1:59:49 degree:min:sec, and a truncation gap of 52 microns.

After formation, separation indices are measured on a LUMiSizer 12-channel instrument (manufactured by LUM). Approximately 1.2 mL of liquid composition into a 10 mm polyamide synthetic cells and spun at 855 g-force for approximately 3 hours at a Light Factor of 1 and at 25 degrees Celsius. Using LUM's SEPview 6 software, the separation index is determined by reading the sample cell between 115.2 mm and 129.7 mm. Separation indices range from 0 to 1.0 with 0 signifying 0% separation (completely stable) and 1.00 signifying 100% separation. Anything less than 0.2 was considered stable. This test roughly represents that amount of separation that would occur after approximately 2565 hours at 25 degrees Celsius at 1 g-force (i.e. standard room temperature stability). 2565 hours is determined by multiplying 855 (the amount of g-force of the test) times the time in the test (3 hours). 2565 hours is approximately 15 weeks of stability.

After formation, each composition was evaluated to determine the yield point (Pa) at 20° C. using an AR2000-EX Rheometer with a geometry cone of 40 mm, 1:59:49 degree:min:sec, and a truncation gap of 52 microns. After each composition was loaded on the instrument, the sample was conditioned with a 30 minute rest at 20° C. prior to the measurement. The procedure was a stepped flow, with the shear stress (Pa) ramping from 0 to 50 Pa, in log mode and with 10 points per decade. The procedure was run at 20° C. with a 35 second constant time and an average that lasted 5 seconds.

TABLE 2

| | MgCl2*6H20 in water (conc. 64%) (wt. %) | Magnesium Cation (wt. %) | Turbidity (NTU) | Viscosity at 20 C. (cP at 3.2 1/s) | Stable after 3 days at 24° C. (Response is no if phase separation occurred) | Separation Index after 3 hours at ~855 g-force (LUMiSizer) | Yield Point (Pa) |
|---|---|---|---|---|---|---|---|
| Composition 2 | 0 | 0 | 5 | 900 | N/A | N/A | 0.039 |
| Composition 3 | 0.105 | 0.013 | 5 | 900 | N/A | N/A | 0.024 |
| Composition 4 | 0.21 | 0.025 | 1050 | 800 | No | 0.819 | 0.03 |
| Composition 5 | 0.315 | 0.038 | 2100 | 1100 | No | 0.525 | 0.06 |
| Composition 6 | 0.42 | 0.050 | 2400 | 820 | No | 0.387 | 0.01 |
| Composition 7 | 0.525 | 0.063 | 2700 | 1220 | Yes | 0.013 | 0.15 |
| Composition 8 | 0.63 | 0.076 | 2400 | 1800 | Yes | 0.023 | 0.19 |
| Composition 9 | 0.735 | 0.088 | 2000 | 2400 | Yes | 0.007 | 0.6 |
| Composition 10 | 0.84 | 0.101 | 2900 | 1800 | Yes | 0.011 | 0.24 |
| Composition 11 | 1.25 | 0.150 | 3000 | 3700 | Yes | 0 | 1.34 |
| Composition 12 | 2.5 | 0.300 | 4000+ | 12000* | Yes | 0.001 | 18.9 |
| Composition 13 | 3.75 | 0.450 | 4000+ | 18000* | Yes | 0.001 | 35.1 |

Compositions 2 and 3 neither produced an opacification effect nor produced a structuring effect. Compositions 4, 5 and 6 produced an opacification effect but did not produce a structuring effect.

Compositions 7 to 12 provided an opacification effect and a strong structuring effect due to the higher inclusion of magnesium cation (Yield Point was above 0.075 Pa).

Compositions 7 to 11 also exhibited significant improvement for gravitational separation, with Separation Indices less than 0.2 as well as exhibited no phase separation after 3 days at 75 F. Compositions 1 and 2 did not have a Separation Index (since turbidity is required to measure separation) and Compositions 3, 4, and 5 were not stable due to a Separation Index greater than 0.2 as well as exhibiting phase separation before 3 days. However, Compositions 7 to 11 did not produce a delayed on-set fluid gel effect.

Compositions 12 and 13 produced a strong structuring, opacification and a delayed on-set fluid gel effect.

Compositions 12 and 13 were then placed into glass jars for stability testing at −17° C., 4° C., 25 F, 37 F, and 52 F. The samples were evaluated weekly at all temperatures for 4 weeks. All samples did not exhibit phase separation and provided good opacification for the time tested.

The following experiment was used to measure the delayed onset fluid gel effect of Compositions 12 and 13 versus Composition 2.

Compositions 2, 12 and 13 were created as described in Example 1.

After formation, the viscosity (Pa.$) of Compositions 2, 12 and 13 was evaluated over a 24 hour period at 20° C. using an AR2000-EX Rheometer with a geometry cone of 40 mm, 1:59:49 degree:min:sec, and a truncation gap of 52 microns. Two separate shear rates were used to measure: 0.41 l/s and 1.08 l/s. The results are described below in Table 3.

TABLE 3

| Minutes | Composition 2 | Composition 12 | | Composition 13 | |
|---|---|---|---|---|---|
| after batch formation | Viscosity at 0.41/s and 1.08 1/s (Pa · s) | Viscosity at 0.41/s (Pa · s) | Viscosity at 1.08/s (Pa · s) | Viscosity at 0.41/s (Pa · s) | Viscosity at 1.08/s (Pa · s) |
| 0 | 0.425 | 1.609 | 1.216 | 6.325 | 3.656 |
| 15 | | 4.842 | 2.893 | 20.91 | 10.19 |
| 30 | | 8.977 | 4.867 | 33.21 | 15.55 |
| 45 | | 14.93 | 7.803 | 46.58 | 21.25 |

TABLE 3-continued

| Minutes | Composition 2 | Composition 12 | | Composition 13 | |
|---|---|---|---|---|---|
| after batch formation | Viscosity at 0.41/s and 1.08 1/s (Pa · s) | Viscosity at 0.41/s (Pa · s) | Viscosity at 1.08/s (Pa · s) | Viscosity at 0.41/s (Pa · s) | Viscosity at 1.08/s (Pa · s) |
| 60 | | 16.40 | 8.389 | 48.73 | 21.80 |
| 75 | | 19.55 | 9.725 | 53.78 | 24.00 |
| 90 | | 21.60 | 10.84 | 63.46 | 27.43 |
| 105 | | 23.91 | 11.77 | 67.13 | 28.61 |
| 120 | | 27.34 | 13.27 | 73.62 | 31.18 |
| 150 | | 32.32 | 15.20 | 85.49 | 35.45 |
| 180 | | 31.38 | 14.95 | 94.74 | 39.08 |
| 330 | | 59.16 | 23.29 | 129.8 | 51.15 |
| 460 | | 73.00 | 28.65 | 125.8 | 49.39 |
| 1440 (24 hr) | | 102.0 | 39.97 | 163.1 | 31.35 |

Table 3 demonstrates the increase in viscosity over time of Compositions 12 and 13 versus Composition 1 (viscosity did not change during the measured period). For reference, a viscosity of 1 Pa·s equals 1,000 centipoise.

At 24 hours after formation, at 0.41 l/s shear, the viscosity of Composition 12 increased by approximately 62 times (1.609 Pa·s vs. 102) and Composition 13 saw an approximate 25 times increase in viscosity (6.325 Pa·s vs. 163.1). This period of increasing viscosity over 24 hours can be referred to as the “setting” period.

At rest (no shear), both of these compositions resembled a gel and a container of Composition 12 and 13 could be completely inverted without any movement of liquid. The 1.08 l/s shear demonstrates that Compositions 12 and 13 reduce their viscosity when shear is placed on the system. Table 4 (below) further demonstrates the fluid gel behavior of Compositions 12 and 13 by measuring viscosity over a range of shear rates, after the Compositions "set" for 24 hours. The data in Table 4 was measured at 20° C. using an AR2000-EX Rheometer with a geometry cone of 40 mm, 1:59:49 degree:min:sec, and a truncation gap of 52 microns, at the described Shear Rate and Shear Stress.

TABLE 4

| Composition 12 | | | Composition 13 | | |
|---|---|---|---|---|---|
| Shear Stress (Pa) | Shear Rate (1/s) | Viscosity (Pa · s) | Shear Stress (Pa) | Shear Rate (1/s) | Viscosity (Pa · s) |
| 41.71 | 0.4088 | 102 | 67.31 | 0.4127 | 163.1 |
| 42.62 | 0.7396 | 57.63 | 67.36 | 0.7487 | 89.97 |
| 42.93 | 1.074 | 39.97 | 66.39 | 1.082 | 61.35 |
| 42.75 | 1.403 | 30.48 | 65.9 | 1.409 | 46.77 |
| 42.36 | 1.737 | 24.39 | 65.23 | 1.732 | 37.67 |
| 42.02 | 2.067 | 20.33 | 64.24 | 2.062 | 31.15 |
| 41.62 | 2.397 | 17.36 | 62.97 | 2.392 | 26.33 |
| 41.27 | 2.727 | 15.13 | 61.34 | 2.735 | 22.43 |
| 40.94 | 3.05 | 13.42 | 59.75 | 3.059 | 19.53 |
| 40.58 | 3.391 | 11.96 | 58.45 | 3.386 | 17.26 |
| 40.32 | 3.717 | 10.85 | 57.27 | 3.712 | 15.43 |
| 40.18 | 4.039 | 9.949 | 56.01 | 4.048 | 13.84 |
| 40.02 | 4.376 | 9.145 | 54.88 | 4.372 | 12.55 |
| 39.87 | 4.702 | 8.479 | 53.85 | 4.709 | 11.43 |
| 39.68 | 5.036 | 7.879 | 53.14 | 5.031 | 10.56 |

Table 4 demonstrates a reduction in viscosity of Compositions 12 and 13 when sufficient Shear Stress and Shear Rate is placed on the system. Composition 12 had a drop in viscosity from 102 Pa·s at 0.4088 shear rate (1/s) to 7.879 Pa·s at 5.036 shear rate (1/s), which is a 92.3% drop in viscosity. Composition 13 had a drop in viscosity from 163.1 Pa·s at 0.4127 shear rate (1/s) to 10.56 Pa·s at 5.031 shear rate (1/s), which is a 93.5% drop in viscosity.

A composition with viscosity of 7 to 11 Pa·s flows as a liquid, not a gel, enabling Compositions 12 and 13 to behave as a gel at rest (after setting) and behave as a liquid when under sufficient shear.

Example 2

Example 2 provides exemplary formulations containing encapsulated fragrances.

TABLE 5

| COMPONENT | ACTIVITY % | COMPOSITION # 14 USE-LEVEL w/w % | COMPOSITION # 15 USE-LEVEL w/w % |
|---|---|---|---|
| Glycerin | 99 | 10.7 | 8 |
| Optical Brightener | 68.0 | 0.5 | 0.2 |
| DI Water | 100.0 | 6.95 | 6.95 |
| Propylene Glycol | 99+ | 5.8 | 8 |
| Performance Polymers | 75 | 8.2 | 3 |
| Alcohol Ethoxy sulfate, C12 to C15, 3EO | 60 | 0 | 26 |
| Alcohol Ethoxylate C13 to C15, 8EO | 99+ | 24 | 0 |
| Alcohol Ethoxylate C12 to C15, 7EO | 99+ | 0 | 23 |
| Linear Alkylbenzene Sulfonic Acid | 96.0 | 24.1 | 5 |
| Coconut Fatty Acid | 100.0 | 7.45 | 10 |

TABLE 5-continued

| COMPONENT | ACTIVITY % | COMPOSITION # 14 USE-LEVEL w/w % | COMPOSITION # 15 USE-LEVEL w/w % |
|---|---|---|---|
| Bittering Agent | 25 | 0.04 | 0.05 |
| Fragrance (Neat Oil) | 100 | 0.75 | 0.5 |
| Encapsulated Fragrance Slurry | 30 | 2 | 2 |
| Monoethanolamine | 100 | 6.73 | 3.15 |
| Dye | 100 | 0.05 | 0.05 |
| Enzymes | 100.0 | 1.02 | 1.02 |
| Magnesium Chloride Hexahydrate, 64% Aqueous Solution | 64 | 3.75 | 3.75 |
| QS Glycerin | | QS to 100% | QS to 100% |
| TOTAL | | 100 | 100 |

One non-ionic Alcohol Ethoxylate is a C13-C15 Alcohol Ethoxylate that is capped with approximately 8 moles of ethylene oxide.

Another non-ionic Alcohol Ethoxylate is a C12-C15 Alcohol Ethoxylate that is capped with approximately 7 moles of ethylene oxide.

Alcohol Ethoxy Sulfate is an anionic surfactant with C12-C15 with 3 moles of ethoxylation.

Linear Alkylbenzene Sulfonic Acid is 2-Phenyl Sulfonic Acid, an anionic surfactant.

Magnesium Chloride Hexahydrate is available from VWR.

Performance polymer is preferred to be Sokalan HP20 (Ethoxylated Polyethyleneimine).

Having now fully described this invention, it will be understood by those of ordinary skill in the art that the same can be performed within a wide and equivalent range of conditions, formulations and other parameters without affecting the scope of the invention or any embodiment thereof. All patents, patent applications and publications cited herein are fully incorporated by reference in their entirety.

The foregoing description of the specific embodiments has revealed the general nature of the invention such that others can, by applying knowledge within the skill of the art, readily modify and/or adapt for various applications such specific embodiments, without undue experimentations, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A unit dose detergent product comprising:

A. a container formed from a water-soluble or water-dispersible film material;

B. a detergent composition enclosed in the container, said composition comprising:

a) a surfactant system present in an amount of about 20 to about 70 weight percent based on a total weight of said detergent composition and comprising;

(1) at least one anionic surfactant comprising an alcohol ethoxy sulfate having a $C_8$-$C_{20}$ backbone that is ethoxylated with from about 1 to about 10 moles of ethylene oxide or linear alkylbenzene sulfonate; and (2) at least one non-ionic surfactant comprising an alkoxylated alcohol;

b) water present in a total amount of from about 10 to about 30 weight percent based on a total weight of said detergent composition;

c) a fatty acid or a salt thereof present in an amount of from about 2 to about 12 weight percent based on a total weight of said detergent composition; wherein the salt of the fatty acid is capable of being neutralized in the composition to release the fatty acid;

d) a magnesium salt comprising a magnesium cation component and a counterion component, wherein the magnesium cation component is present in an amount of from about 0.15 to about 1.0 weight percent based on a total weight of said detergent composition; and e) colloidal particles present in an amount of about 0.02 to 5.0 weight percent based on the total weight of said detergent composition;

wherein a weight ratio between the fatty acid and the magnesium salt is from 2:1 to 30:1;

wherein the colloidal particles are homogenously dispersed in said detergent composition and the detergent composition maintains its homogenous status over a shelf life of between 1 and 30 months at room temperature; and wherein said detergent composition forms a gel within 1 to 3 days of mixing all composition ingredients.

2. The unit dose detergent product of claim 1, wherein the composition is free of a structuring polymer and free of an opacifying agent.

3. The unit dose detergent product of claim 2, wherein the composition is free of crystallized triglycerides.

4. The unit dose detergent product of claim 1, wherein said detergent composition has a yield point value greater than 0.5 Pa at 20° C., a turbidity value greater than 1000 NTU, and a viscosity at 20° C. greater than 70 Pa·s and said viscosity capable of being reduced by more than 75% under shear.

5. The unit dose detergent product of claim 1, wherein the magnesium cation component is derived from magnesium chloride, magnesium sulfite, magnesium bisulfite, or magnesium sulfate.

6. The unit dose detergent product of claim 1, wherein the colloidal particles comprise an encapsulated fragrance.

7. The unit dose detergent product of claim 1, wherein the at least one anionic surfactant and the at least one non-ionic surfactant has a weight ratio from 3:1 to 1:3.

8. The unit dose detergent product of claim 1, wherein the composition further comprises at least one additive ingredient selected from the group consisting of enzymes, free oil fragrance, chelators, and non-structuring performance polymers.

9. A fluid-gel detergent composition comprising:

a) a surfactant system present in an amount of about 20 to about 70 weight percent based on a total weight of said detergent composition and comprising;

(1) at least one anionic surfactant comprising an alcohol ethoxy sulfate having a $C_8$-$C_{20}$ backbone that is ethoxylated with from about 1 to about 10 moles of ethylene oxide or linear alkylbenzene sulfonate; and (2) at least one non-ionic surfactant comprising an alkoxylated alcohol;

b) water present in a total amount of from about 10 to about 30 weight percent based on a total weight of said detergent composition;

c) a fatty acid or a salt thereof present in an amount of from about 2 to about 12 weight percent based on a total weight of said detergent composition;

wherein the salt of the fatty acid is capable of being neutralized in the composition to release the fatty acid; and d) a magnesium salt comprising a magnesium cation component and a counterion component, wherein the magnesium cation component is present in an amount of from about 0.15 to about 1.0 weight percent based on a total weight of said detergent composition;

wherein a weight ratio between the fatty acid and the magnesium salt is from 2:1 to 30:1;

wherein said detergent composition has a yield point value greater than 0.5 Pa at 20° C., a turbidity value greater than 1000 NTU, and a viscosity at 20° C. greater than 70 Pa·s and said viscosity capable of being reduced by more than 75% under shear; and wherein said detergent composition is in the form of a gel, wherein the gel forms within 1 to 3 days of mixing all composition ingredients and acts as a plastic before the yield point is reached and acts as a liquid after the yield point is reached.

10. The fluid-gel detergent composition of claim 9, further comprising colloidal particles present in an amount of about 0.02 to 5.0 weight percent based on the total weight of said detergent composition.

11. The fluid-gel detergent composition of claim 9, wherein the magnesium cation component is derived from magnesium chloride, magnesium sulfite, magnesium bisulfite, or magnesium sulfate.

12. The fluid-gel detergent composition of claim 9, wherein the composition is free of a structuring polymer and free of an opacifying agent.

* * * * *